United States Patent [19]
Heeb et al.

[11] Patent Number: 5,918,033
[45] Date of Patent: *Jun. 29, 1999

[54] METHOD AND APPARATUS FOR DYNAMIC LOCATION AND CONTROL OF PROCESSOR RESOURCES TO INCREASE RESOLUTION OF DATA DEPENDENCY STALLS

[75] Inventors: Jay Heeb, Gilbert; Mark Schaecher, Phoenix, both of Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/780,675

[22] Filed: Jan. 8, 1997

[51] Int. Cl.$^6$ ......................................................... G06F 9/38
[52] U.S. Cl. ................................................................ 395/393
[58] Field of Search ............................................... 395/393

[56] References Cited

U.S. PATENT DOCUMENTS

| | | | |
|---|---|---|---|
| 4,891,753 | 1/1990 | Buddle et al. | 395/393 |
| 4,903,196 | 2/1990 | Pomerene et al. | 395/393 |
| 5,546,554 | 8/1996 | Yung et al. | 395/393 |

OTHER PUBLICATIONS

Hinton, Glenn, *80960—Next Generation*, IEEE, 1989, pp. 13–17.

Yoshida et al., A Strategy for Avoiding Pipeline Interlock Delays in a Microprocessor, LSI Research and Development Labroatory, IEEE 1990, pp. 14–19.

*Primary Examiner*—Richard L. Ellis
*Attorney, Agent, or Firm*—Blakely, Sokoloff, Taylor & Zafman

[57] ABSTRACT

A processor for executing a set of instructions, where each instruction in said set of instructions includes a set of operand references. The processor includes an instruction decoder for extracting the set of operand references from each instruction in the set of instructions; a register file decoder connected to the instruction decoder for receiving the set of operand references and generating a set of register data select signals; and, a register file connected to the register file decoder for receiving the set of register data select signals. Further, the register file includes: a set of registers; a first set of scoreboard bits; and, a second set of scoreboard bits; wherein for each signal in the set of register data select signals, the register file outputs: (1) a corresponding register from the set of registers; (2) a first corresponding scoreboard bit from the first set of scoreboard bits; and, (3) a second corresponding scoreboard bit from the second set of scoreboard bits.

11 Claims, 3 Drawing Sheets

METHOD AND APPARATUS FOR DYNAMIC LOCATION AND CONTROL OF PROCESSOR RESOURCES TO INCREASE RESOLUTION OF DATA DEPENDENCY STALLS

BACKGROUND OF THE INVENTION

1. Field of the Invention

The present invention relates to the field of use of processor architecture. More particularly, the present invention relates to the use of additional scoreboard bits in register files for dynamic allocation and control of processor resources to accelerate the resolution of a data dependency stall which is causing a hardware interlock.

2. Description of Related Art

Register files are arrays in processors that store one or more architecturally defined registers. Currently, associated with each of these registers is a bit which indicates whether the data inside the respective register is either: (1) updated and ready to be used; or, (2) being modified or produced ("busy") and therefore not available. This bit is referred to as a "scoreboard" bit. Also, the use of the scoreboard bit by a mechanism to "lock-out" access to a register is referred to as a "hardware interlock." The hardware interlock is used instead of placing the extra burden for maintaining the status of each register in software.

For example, if a scoreboard bit for a particular register is set, then the next instruction which has a data dependency on this data, and therefore needs to access this register, cannot execute until the scoreboard bit has been cleared. For an in-order issue processor, this creates a condition known as a "stall." For an out-of-order issue processor this can stall any given execution unit(s), which limits execution bandwidth. To clear the register bit, a preceding operation, which is the operation that is generating/modifying the data to be placed/returned to this register, needs to complete execution. Thus, if a program were to (1) execute a LOAD of a first value and place it into a register R4; and then, (2) execute an ADD of the first value in R4 with a second value contained in a register R5; then there is a data dependency on the LOAD operation.

Although the use of a scoreboard bit in conjunction with a hardware interlock mechanism provides information as to the availability of the data contained in a register, there is no provision of determining WHAT is causing the unavailability. Specifically, there is no indication of whether the dependency is due to a memory operation (e.g., a memory LOAD operation), a register operation (e.g., a register divide operation) an instruction co-processor operation (e.g., a floating point unit operation) and other operations.

SUMMARY OF THE INVENTION

To provide information as to why a particular register is busy or inaccessible, one or more bits are used in addition to the normal scoreboard bit for that particular register to indicate the nature of the delay. Thus, additional scoreboard bits can be added to indicate that a stall is being caused by, for example, a memory operation, a register operation, an instruction co-processor operation, or other operations.

For example, if a register is a specified operand in an instruction that is to be issued but is inaccessible due to an outstanding LOAD operation, this information will be provided by the additional scoreboard bits. The additional information will help in the development of a stall profile, which will be that the stall condition is caused by waiting for LOAD data to return. Based on this stall profile, the processor can dynamically modulate how operations are prioritized and resources are allocated.

By being able to correlate causes for stalls and the shared resources involved in those stalls, priorities assigned to different tasks can be dynamically changed to optimize the use of those shared resources. Consequently, total system throughput can be increased.

One embodiment of the present invention involves a set of instructions which are to be executed by a processor, where each instruction in the set of instructions includes a set of operand references. The processor includes an instruction decoder for extracting the set of operand references from each instruction in the set of instructions; a register file decoder connected to the instruction decoder for receiving the set of operand references and generating a set of register data select signals; and, a register file connected to the register file decoder for receiving the set of register data select signals. Further, the register file includes: a set of registers; a first set of scoreboard bits; and, a second set of scoreboard bits; wherein for each signal in the set of register data select signals, the register file outputs: (1) a corresponding register from the set of registers; (2) a first corresponding scoreboard bit from the first set of scoreboard bits; and, (3) a second corresponding scoreboard bit from the second set of scoreboard bits.

Other features and advantages of the invention will be apparent from the accompanying drawings, and from the detailed description that follows below.

DETAILED DESCRIPTION OF THE INVENTION

The present invention provides a method and apparatus for dynamic resource allocation and stall reduction through the use of additional scoreboard bits. For purposes of explanation, specific embodiments are set forth to provide a thorough understanding of the present invention. However, it will be understood by one of ordinary skill in the art, from reading this disclosure, that the invention may be practiced without these details. Further, although the present invention is described through the use of a register file internal to a microprocessor, most, if not all, aspects of the invention apply to systems needing to optimize shared resources with sequential ordering dependencies in general. Moreover, well-known elements, devices, process steps and the like are not set forth in detail in order to avoid obscuring the present invention.

Figure 1:
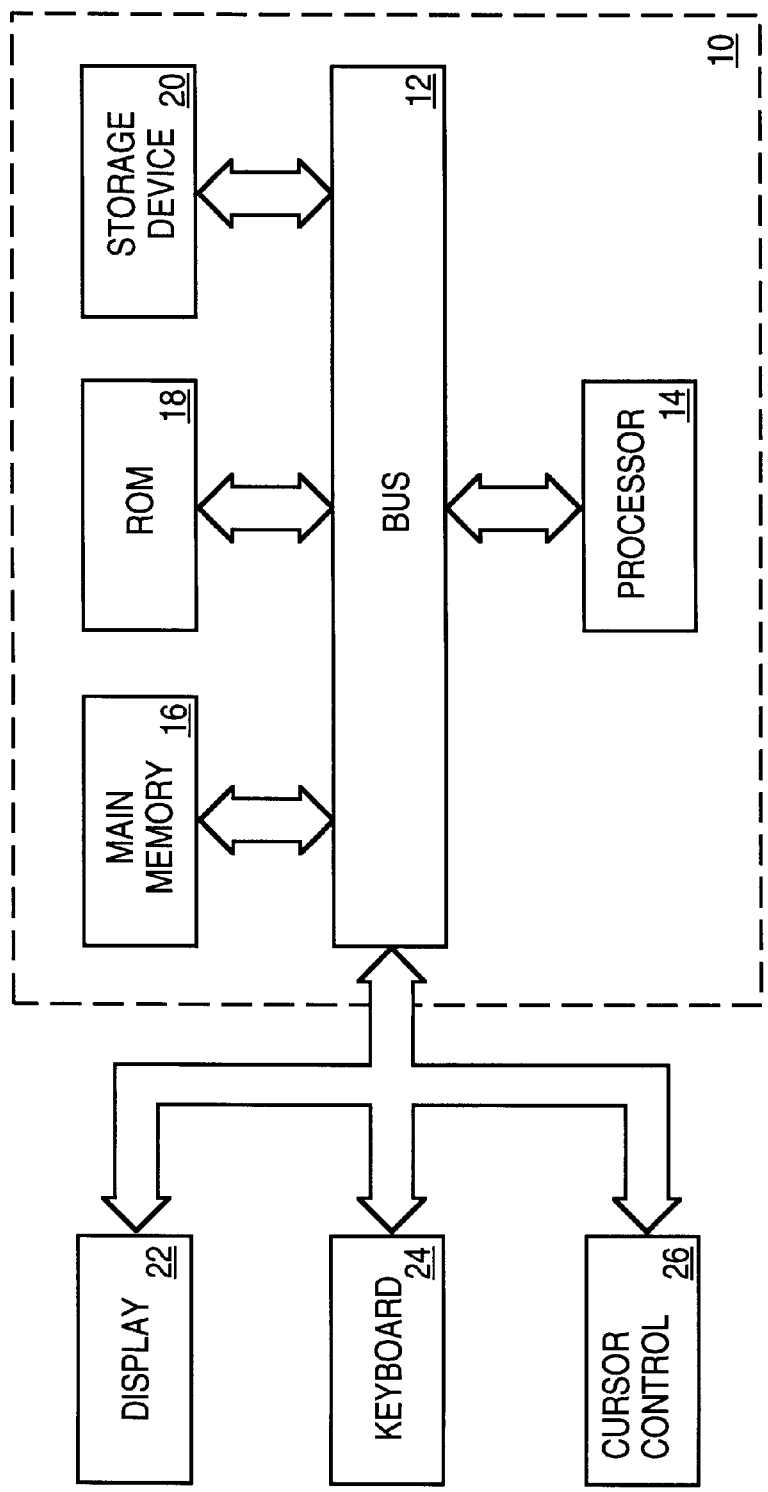
FIG. 1 is a block diagram of a computer system in which an embodiment of the present invention can be implemented.

FIG. 1 is a block diagram of a computer system 10 in which an embodiment of the present invention can be implemented. Computer system 10 includes a bus 12 for communicating information, and a processor 14 coupled to bus 12 for processing information. Computer system 10 further includes a main memory 16, which can be random access memory (RAM) or another dynamic storage device, coupled to bus 12 for storing information and instructions to be executed by processor 14. Main memory 16 may also be used for storing temporary variables or other intermediate information during execution of instructions by processor 14. Computer system 10 also includes a read only memory (ROM) and/or other static storage device 18 coupled to bus 12 for storing static information and instructions for processor 14. A data storage device 20 is coupled to bus 12 for storing information and instructions.

Data storage device 20 can be a device such as a magnetic disk or optical disk, and is coupled to computer system 10 through the use of bus 12. Computer system 10 can also be coupled via bus 12 to a display device 22, such as a cathode ray tube (CRT), for displaying information to a computer user. A keyboard 24, which is an alphanumeric input device including alphanumeric and other keys, is typically coupled to bus 12 for communicating information and command selections to processor 14. Another type of user input device is cursor control 26, such as a mouse, a trackball, or cursor direction keys for communicating direction information and command selections to processor 14 and for controlling cursor movement on display 22. This input device typically has two degrees of freedom in two axes, a first axis (e.g., x) and a second axis (e.g., y), which allows the device to specify positions in a plane.

Figure 2:
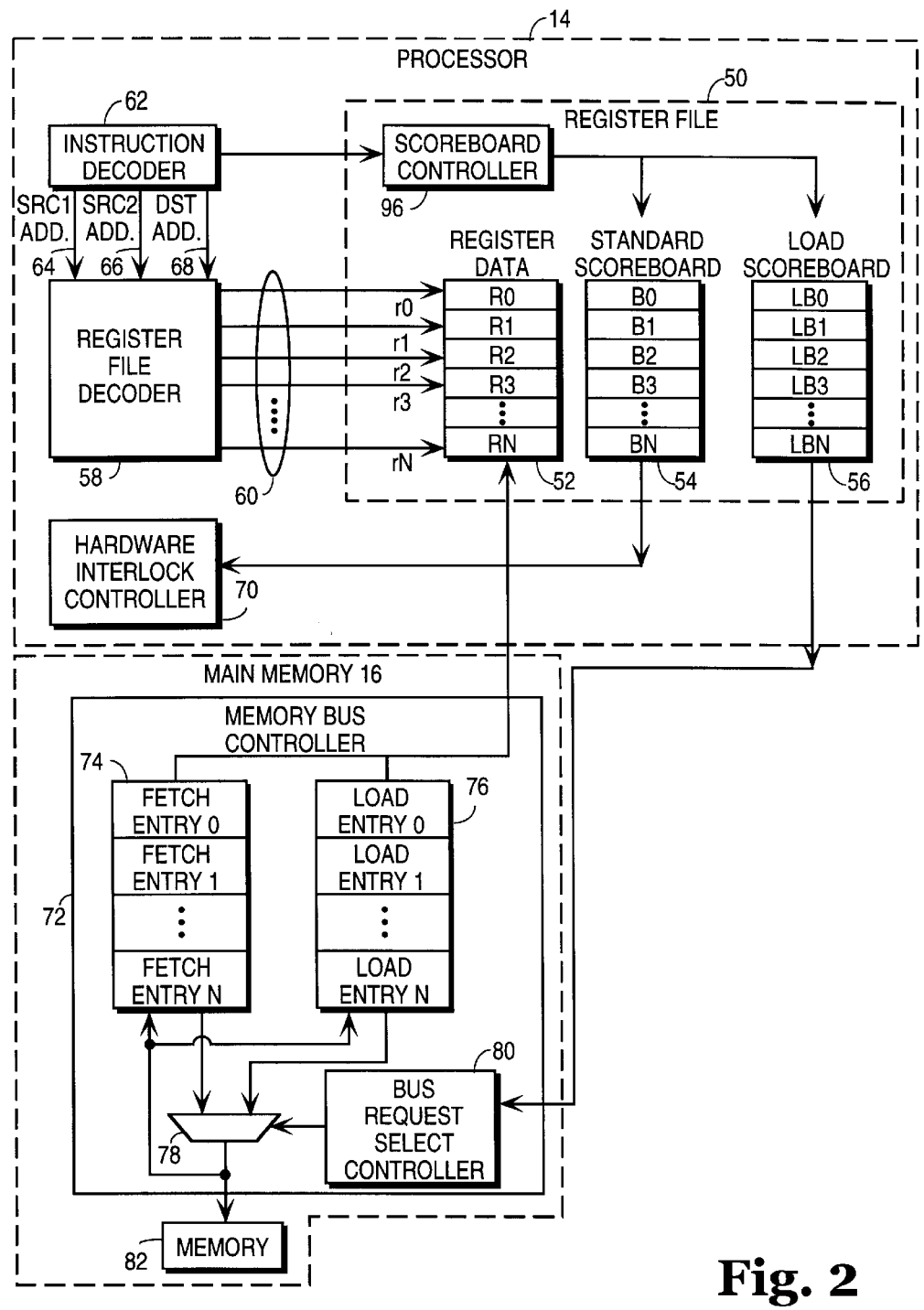
FIG. 2 is a block diagram of a first exemplary dynamic stall reduction system configured in accordance with a first embodiment of the present invention; and, FIG. 3 is a block diagram of a second exemplary dynamic stall reduction system configured in accordance with a embodiment of the present invention.

FIG. 2 is a block diagram of a dynamic stall reduction system configured in accordance with a first embodiment of the present invention. Referring to FIG. 2, processor 14 includes a register file 50 containing a set of registers 52 R0 through RN; a set of standard scoreboard bits 54 B0 through BN; and a set of load scoreboard bits 56 LB0 through LBN. A register file decoder 58 is coupled to register file 50 through the use of a set of register select lines 60 r0 through rN. Register file decoder 58 is also coupled to an instruction decoder 62 with a first source address line 64, a second source address line 66, and a destination address line 68 (labeled "SRC1 ADD.", "SRC2 ADD.", and "DST ADD.", respectively, in FIG. 2). Instruction decoder 62 is also coupled to a scoreboard controller 96 contained in register 50.

Continuing to refer to FIG. 2, a hardware interlock controller 70 is coupled to set of standard scoreboard bits 54 in register file 50. In addition, from main memory 16, a memory bus controller 72 is coupled to set of registers 52; memory 82; and set of load scoreboard bits 56 through the use of a fetch queue 74 and a load queue 76; a queue selector 78; and a bus request select controller 80, respectively.

In the preferred embodiment, instruction decoder 62 decodes the portion of an instruction which contains the operands (i.e., references to data contained in set of registers 52 in register file 50) to be used in the operation and sends the addresses of up to three operands to register file decoder 58 through first source address line 64, second source address line 66, and destination address line 68. Register file decoder 58 decodes the addresses received on first source address line 64, second source address line 66, and destination address line 68 and then selects the three corresponding registers in register file 50. In alternate embodiments, the total number of operands that can be handled simultaneously can be more or less than three.

Register data is stored in set of registers 52 R0 through RN. Associated with each register R0 through RN is one bit from: (1) set of standard scoreboard bits 54 B0 through BN; and (2) set of load scoreboard bits 56 LB0 through LBN. In the preferred embodiment, only the status of the three operands specified in the current instruction to be issued (pointed to by first source address line 64, second source address line 66, and destination address line 68—i.e., SRC1 ADD., SRC2 ADD., DST ADD., respectively) is of interest. For each of these, the corresponding information contained in: (1) set of standard scoreboard bits 54 B0 through BN; and (2) set of load scoreboard bits 56 LB0 through LBN, along with the three associated registers from set of registers 52 can be read out simultaneously. Thus, in the system contained in FIG. 2, each data set associated with an operand would contain a register data portion, a standard scoreboard bit portion, and a load scoreboard bit portion. Register file 50 is configured to be a memory structure which is sufficiently ported to allow simultaneous access to register data and scoreboard bits.

Each bit of set of standard scoreboard bits 54 B0 through BN contain qualifying information of the data in a respective register. For example, when an operation is to return result data to register R2, scoreboard bit B2 is asserted to indicate that register R2 is "busy". Scoreboard bit B2 is asserted until the operation which produces the data to be stored in register R2 has completed. While waiting for the data in register R2 to become valid, the processor can "stall" when subsequent instructions have data dependencies on register R2. Thus, the execution of subsequent instructions in single pipeline processors (or, in multiple pipeline or out-of-order processors, the execution of subsequent instructions which depend on the current instruction) is stopped due to these dependencies. The occurrence of these dependencies are known as "data hazard conditions."

Hardware interlock controller 70 uses information contained in set of standard scoreboard bits 54 B0 through BN and prevents access to any registers in set of registers 52 R0 through RN in register file 50 which are busy. For any cycle which has a valid instruction, only the operand references contained in the valid instruction (i.e., operand addresses or pointers to the register file), are being read out. Therefore, only the registers and scoreboard bits containing the data and information of interest, respectively, are being read out and provided. The scoreboard bits which are not of interest will not be read out and therefore do not affect prioritization of tasks or allocation of resources. Thus, during normal operations, only the "necessary" bits in set of scoreboard bits 54 (i.e. the scoreboard bits associated with the registers being referenced by first source address line 64, second source address line 66, and a destination address line 68) are used by hardware interlock controller 70 to prevent access for the present instruction. For example, when the data contained in register R2 is not yet valid, hardware interlock controller 70 will prevent execution of the instruction(s) which depends on the data in register R2.

Although set of scoreboard bits 54 contains information as to the availability of each register in set of registers 52, set of scoreboard bits 54 does not offer any indication as to what is causing the unavailability of a particular register in set of register 52. In the preferred embodiment, the additional functionality of indicating the fact that a particular register is unavailable due to an outstanding LOAD operation to return data to the register is provided by set of load scoreboard bits 56. Thus, when the data contained in a particular register is unavailable due to the incompletion of a LOAD operation, that register will have its respective load scoreboard bit asserted, in addition to having its respective standard scoreboard bit asserted.

Each instruction contains an opcode portion, specifying the operation to be performed (e.g., ADD or LOAD); and up to three operands, each specifying the address locations of a register to be used in the operation. Scoreboard controller 96 is used to set the standard scoreboard bits and load scoreboard bits contained in set of standard scoreboard bits 54 and set of load scoreboard bits 56, respectively, based on the opcode and the operands referenced in the opcode.

As discussed above, processor 14 is coupled to memory bus controller 72 having both: (1) LOAD queue 76 that handles data loads; and (2) FETCH queue 74 that handles instruction fetches. In the preferred embodiment, LOAD queue 76 can also handle data stores. In alternate embodiments, a separate STORE queue can be used to handle data stores.

During normal operation, bus request select controller will alternate to select entries from LOAD queue 76 and FETCH queue 74 according to a predetermined set of rules. The specific set of rules are implementation specific and, to the extent that the set of rules is not related to the explanation of the present invention, is not further discussed herein.

In the preferred embodiment, set of load scoreboard bits 56 is coupled to bus request select controller 80 to cause bus request select controller 80 to prioritize the processing of the entries contained in load queue 76 when any one of the current load scoreboard bits of interest (i.e., the three load scoreboard bits associated with the three registers that are referenced as the operands in the current instruction) is asserted. Thus, if a LOAD instruction is causing the stall, and the execution of the LOAD instruction is being delayed in memory bus controller 72 as there are elements in FETCH queue 74 that is to be executed before the LOAD instruction that is causing the stall, LOAD queue 76 can be prioritized over FETCH queue 74 to reduce the stall (i.e., overall latency) based upon this knowledge of the cause of the stall.

In alternate embodiments, even when load scoreboard bits are asserted, bus request select controller 80 can consider other relevant information before prioritizing load queue 76. In this alternate embodiment, whether a load scoreboard bit of interest is set is simply another consideration in the logic contained in bus request select controller 80.

An illustrative example will now be presented by examining the processing of an ADD instruction involving the data contained in registers R2, R3 and R4. Specifically, the ADD instruction will take the data in register R2, add it to the data contained in R3 and place it in register R4. In the preferred embodiment, the ADD instruction of the current example would be of the format: "ADD, R2, R3, R4".

When the ADD instruction is issued, instruction decoder 62 takes in this ADD operation and issues the addresses for register R2, register R3, and register R4 on first source address line 64, second source address line 66, and third source address line 68, respectively to register file decoder 58. Register file decoder 58 will send an enable signal over register select lines r2, r3 and r4 of set of register select lines 60 to simultaneously read out the lines corresponding to registers R2, R3 and R4, respectively from the three ported memory array of register file 50.

The ADD instruction can be stalled (i.e., not issued for execution), if any one of the registers R2, R3, or R4, is scoreboarded (i.e., if any one of the registers R2, R3, or R4 has its associated standard scoreboard bit B2, B3, or B4, in an asserted state) as all of the registers of current interest (i.e., registers R2, R3, and R4) must be valid before the ADD instruction can continue. When register file decoder 58 sends the enable signals to register file 50, the values contained in standard scoreboard bits B2, B3, and B4 of set of standard scoreboard bits 54 will be sent to bus request select controller 80. In the preferred embodiment, the values contained is standard scoreboard bits B2, B3 and B4 are logically OR'd. Therefore, if any of the standard scoreboard bits B2, B3 or B4 are set, bus request select controller 88 will receive an asserted signal.

In this example, assume that a previous LOAD instruction which was to load register R2 with data had not finished execution when the ADD instruction was issued. Thus, standard scoreboard bit B2 would be in an asserted state to indicate that the data in register R2 is not valid. Moreover, load scoreboard bit LB2 would also be in an asserted state to indicate that the reason why the data in register R2 is not valid is because a LOAD operation—specifically, the LOAD operation which was to return data to register R2—is still outstanding. Assume that registers R3 and R4 contain valid data and do not have their scoreboard bits, B3 and B4, set.

As discussed above, scoreboard controller 96 is used to set the scoreboard bits in set of standard scoreboard bits 54 B4 through BN and set of load scoreboard bits 56 LB0 through LBN based on the opcode and the operand(s) referenced in the opcode. In the preferred embodiment, scoreboard controller 96 will examine the opcode and operand references received from instruction decoder 62 and set the standard scoreboard bit(s) and the scoreboard bit(s) corresponding to the type of instruction under which the opcode is classified. Thus, in this example for a LOAD instruction directed at register R2, scoreboard controller 96 would have set both standard scoreboard bit B2 and load scoreboard bit LB2.

With any one of the load scoreboard bits LB2, LB3, and LB4 being set—specifically, with load scoreboard bit LB2 being set—bus request select controller 80 will prioritize the processing of entries in LOAD queue 76. Thus, if LOAD ENTRY 1 contained the data to be returned to register R2, the return of which will allow load scoreboard bit LB2 to be deasserted, then queue selector 78 will be set to prioritize the processing of LOAD queue 76. In the preferred embodiment, the entries in LOAD queue 76 will be processed until the queue entry which needs to be processed to return valid data to register R2 is reached and finished processing. In this example, LOAD ENTRY 0 and then LOAD ENTRY 1 would be processed before bus request select controller 80 returns to normal.

In an alternate embodiment, a particular LOAD ENTRY can be prioritized so that it would be processed at the next available time. Thus, LOAD ENTRY 1 would be processed before LOAD ENTRY 0. In this alternate embodiment, memory bus controller 72 would support disambiguation (i.e., memory reordering) within LOAD queue 76. Moreover, register file decoder 58 would send the actual register addresses of the registers of current interest to provide further information granularity (i.e., information to select which LOAD ENTRY would be executed). The mechanism in the alternate embodiment can be adapted to prioritize specific operations in LOAD queue 76 (e.g., LOAD ENTRY 1), rather than prioritize ALL operations in LOAD queue 76 as a whole.

Once LOAD ENTRY 1 has been processed and the data in register R2 is valid, standard scoreboard bit B2 and load scoreboard bit LB2 are deasserted, with the result that a signal will no longer be sent to bus request select controller 80 to prioritize LOAD queue 76 and bus request select controller 80 will return to normal operations to be controlled by the other criteria which are important at that time, as discussed above.

Figure 3:
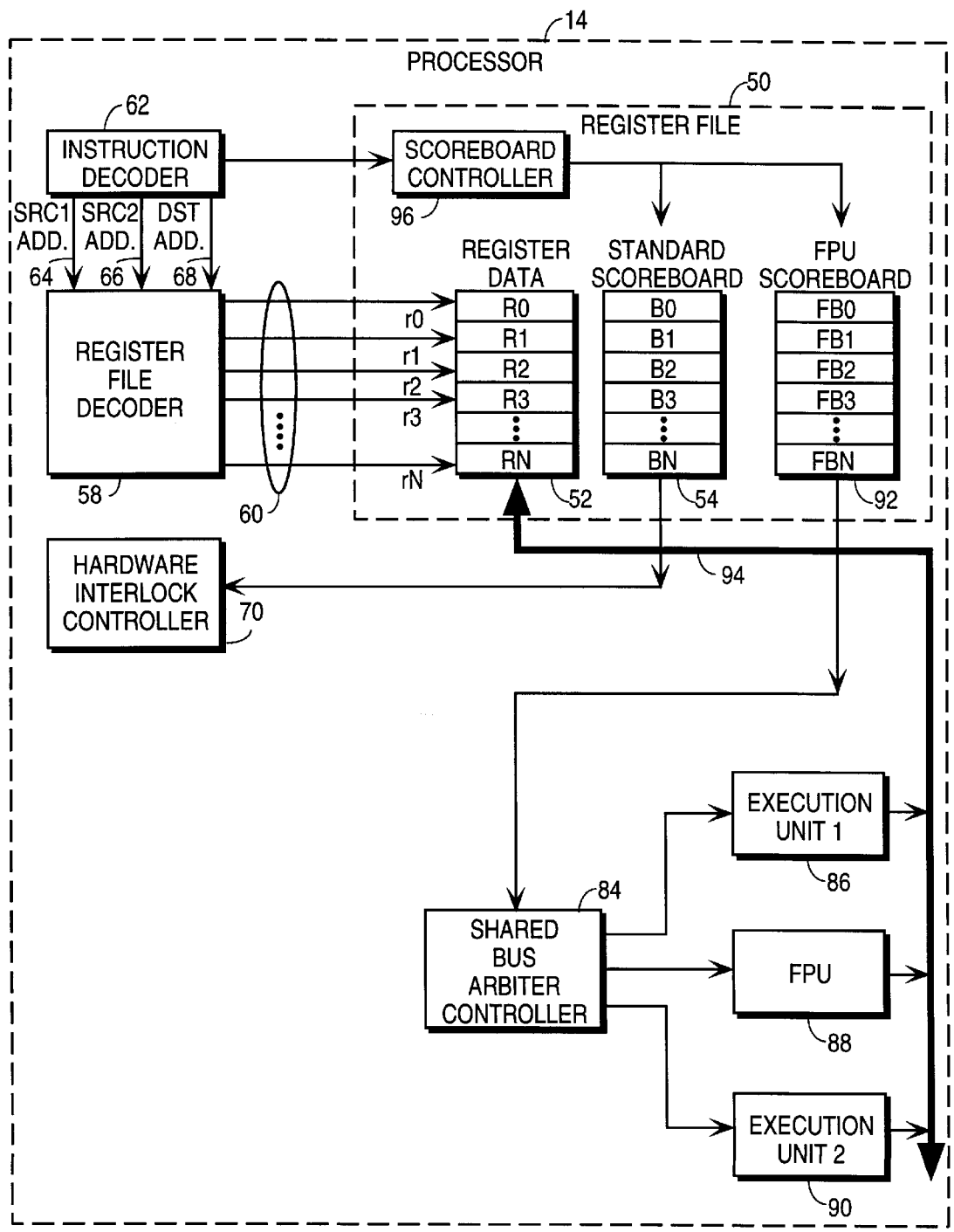

FIG. 3 is a block diagram of a dynamic stall reduction system configured in accordance with a second embodiment of the present invention. In FIG. 3, main memory 16 and set of load scoreboard bits 56 LB0 through LBN are not shown to avoid cluttering of the figure. All other elements which are in FIG. 2 and reproduced in FIG. 3 are as described above. In addition, FIG. 3 has a set of FPU scoreboard bits 92 FB0 through FBN, contained in register file 50, which is coupled to a shared bus arbiter controller 84. Shared bus arbiter controller 84 is itself coupled to a first execution unit 86, a floating-point processing unit (FPU) 88, and a second execution unit 90.

In FIG. 3, the shared resource that is being competed for is a bus, specifically a shared return data bus 92, as opposed to the processing of a queue, as in FIG. 2. Shared bus arbiter controller 84 determines which unit has control of shared return data bus 92 as all three units use shared return data bus 92 to return data to registers R0 through RN in set of registers 52 of register file 50. In the preferred embodiment, during normal operations, shared bus arbiter controller 84 will generate an enable signal to one of first execution unit 86, FPU 88, or second execution unit 90 in accordance with a predetermined set of rules. Other than what is described for the present invention, the actual set of rules that is used is an implementation detail which can be determined by one who is of ordinary skill in the art.

First execution unit 86 and second execution unit 90 are execution units such as multiply/divide units, arithmetic logic units, integer units, or any other unit used to process data and return results on shared return data bus 92. Shared bus arbiter controller 84 will allow FPU 88 to take control of shared return data bus 92 when one of the bits FB0 through FBN in set of FPU scoreboard bits 92 which is of interest is in an asserted state. For example, if an instruction which requires the data contained in register R1 is waiting for FPU 88 to return a result to register R1 from a previous operation, then FPU scoreboard bit FB1 of set of FPU scoreboard bits 92, which was set to an asserted state, along with standard scoreboard bit B1, during the issuance of that previous operation, will be read out to shared bus arbiter controller 84. Shared bus arbiter controller 84 will then grant FPU 88 control of the shared return data bus 92 at the earliest possible time.

It is to be noted that the actual data structure of the scoreboard bits in register file 50 can be configured in many ways such that the indication of a stall and why the stall is occurring can be represented in different ways. For example, as two bits can represent four different possible combinations, there would be no need for separate sets of standard, FPU and load scoreboard bits as these conditions can be represented by the two bits. One possible logic table would be:

VALUE: STATUS OF REGISTER

00: data valid, no data waiting to be returned.
01: data invalid, general stall condition.
10: data invalid, waiting for LOAD to return result.
11: data invalid, waiting for FPU to return result. The implementation of the logic circuit used to decipher the above logic table and to generate the appropriate signals to bus request select controller 80 and shared bus arbiter controller 84 are implementation details which need not be elaborated on further herein.

In addition, some or all of the scoreboard bits can be physically located outside of register file 50. The scoreboard bits can also be implemented in software, either in whole or in part. Therefore, the actual implementation of the functionality provided by the scoreboard bits is a design consideration for achieving desired system cost, complexity and features.

Moreover, which operations are to be prioritized and the set of rules that would be developed to effect that prioritization are implementation specific details and can determined by one of ordinary skill in the art. Thus, it is not further discussed herein. Further, although particular examples of providing stall indicators due to LOAD and FPU operations have been provided, the actual stall indicators to be used is an implementation specific decision. Therefore, the examples presented herein are not to be limiting on the application of the present invention.

Also, the present invention could clearly be applied to any out of order or parallel machine because the concept of adding any extra bits that will give the system more information when a stall occurs can be equally applied to any of these systems. Although the logistics and the control logic would be different for each type of system, depending on how many levels of complexity or how many out of order degrees a system has, the problem of not being able to execute a particular instruction until all the operands which are needed are available remains the same. Thus, when there is a shared resource for which there is competition, the additional information from the scoreboard-type bits allows the prioritization of the allocation of the shared resource to most efficiently reduce the stall by indicating the cause of the stall. Value is added to a system which not only detects the fact that a stall condition exists but also allows the prioritization of whatever mechanism is delivering those operands.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A processor for executing a set of instructions, where each instruction in said set of instructions includes a set of operand references, said processor comprising:

an instruction decoder for extracting said set of operand references from each said instruction;

a register file decoder coupled to said instruction decoder for generating a set of register data select signals based on said operand references; and, a register file including:
a set of registers;
a first set of scoreboard bits;
a second set of scoreboard bits; and,
a controller coupled to said register file for controlling execution order of set of instructions based on said first set of scoreboard bits and said second set of scoreboard bits;

where for each signal in said set of register data select signals, said register file outputs values of: (1) a corresponding register from said set of registers; (2) a first corresponding scoreboard bit from said first set of scoreboard bits; and, (3) a second corresponding scoreboard bit from said second set of scoreboard bits to said controller.

2. The processor of claim 1, wherein:
said first corresponding scoreboard bit is of a first state to indicate that a value contained in said corresponding register is not yet valid due to a stalled operation; and,
said second corresponding scoreboard bit is of a second state to indicate a type of said stalled operation.

3. The processor of claim 1, wherein:
said first corresponding scoreboard bit and said second corresponding scoreboard bit indicate: (1) a value contained in said corresponding register is not yet valid due to an stalled operation; and, (2) a type of said stalled operation.

4. The processor of claim 1, wherein each instruction in said set of instructions further includes an operation having a type, said instruction decoder further extracting said operation from each instruction in said set of instructions, and said processor further comprises:

a scoreboard controller coupled to said instruction decoder for receiving said operation and determining said type.

5. The processor of claim 4, wherein said scoreboard controller is further coupled to said first set of scoreboard bits and second set of scoreboard bits for setting said first set of scoreboard bits and second set of scoreboard bits based on said type and said set of register data select signals.

6. A method for executing a set of instructions, where each instruction in said set of instructions includes a set of operand references, said method comprising the steps of:

extracting said set of operand references from each instruction in said set of instructions;

generating a set of register data select signals;

generating, based on said set of register data select signals, (1) a corresponding register from a set of registers; (2) a first corresponding scoreboard bit from a first set of scoreboard bits; and, (3) a second corresponding scoreboard bit from a second set of scoreboard bits; and, controlling, based on said second corresponding scoreboard bit, execution order of said set of instructions.

7. The method of claim 6, further comprising the steps of:

setting said first corresponding scoreboard bit to a first state to indicate that a value contained in said corresponding register is not yet valid due to an stalled operation; and, setting said second corresponding scoreboard bit to a second state to indicate a type of said stalled operation.

8. The method of claim 6, further comprising the step of:

setting said first corresponding scoreboard bit and said second corresponding scoreboard bit to indicate: (1) a value contained in said corresponding register is not yet valid due to an stalled operation; and, (2) a type of said stalled operation.

9. The method of claim 6, wherein each instruction in said set of instructions further includes an operation having a type, further comprising the steps of:

extracting said operation from each instruction in said set of instructions; and, determining said type of said operation.

10. The method of claim 9, further comprising the step of:

setting said first set of scoreboard bits and second set of scoreboard bits based on said type and said set of register data select signals.

11. A system comprising:

a memory containing a set of instructions, where each instruction in said set of instructions includes a set of operand references;

a processor coupled to said memory for executing said set of instruction, said processor having:

an instruction decoder for extracting said set of operand references from each instruction in said set of instructions;

a register file decoder coupled to said instruction decoder for receiving said set of operand references and generating a set of register data select signals; and, a register file coupled to said register file decoder for receiving said set of register data select signals, said register file having:

a set of registers;

a first set of scoreboard bits;

a second set of scoreboard bits; and, a controller coupled to said register file for controlling execution order of set of instructions based on said first set of scoreboard bits and said second set of scoreboard bits;

wherein for each signal in said set of register data select signals, said register file outputs: (1) a corresponding register from said set of registers; (2) a first corresponding scoreboard bit from said first set of scoreboard bits; and, (3) a second corresponding scoreboard bit from said second set of scoreboard bits.

* * * * *